United States Patent [19]

Goldenberg

[11] Patent Number: 4,912,614
[45] Date of Patent: Mar. 27, 1990

[54] LIGHT VALVE PROJECTION SYSTEM WITH NON IMAGING OPTICS FOR ILLUMINATION

[75] Inventor: Jill F. Goldenberg, Pelham Manor, N.Y.

[73] Assignee: North American Philips Corporation, New York, N.Y.

[21] Appl. No.: 137,048

[22] Filed: Dec. 23, 1987

[51] Int. Cl.$^4$ .............................. F21V 7/12; F21V 9/00
[52] U.S. Cl. .................................... 362/347; 362/261; 362/293; 362/328; 353/31; 350/628
[58] Field of Search ................. 350/628, 630, 174; 362/293, 261, 296, 347, 299, 310, 328; 353/31, 122

[56] References Cited

U.S. PATENT DOCUMENTS

| | | | |
|---|---|---|---|
| 2,604,005 | 7/1952 | Hahn | 353/98 |
| 3,676,667 | 7/1972 | Malifaud | 362/310 X |
| 3,798,441 | 3/1974 | Wilson | 362/261 |
| 3,827,782 | 8/1974 | Boudouris et al. | 362/347 |
| 4,230,095 | 10/1980 | Winston | 350/62.8 X |
| 4,355,350 | 10/1982 | Mader | 350/628 X |
| 4,368,963 | 1/1983 | Slotov | 353/84 X |
| 4,370,026 | 1/1983 | Dubroeucq et al. | 350/174 X |
| 4,545,651 | 10/1985 | Kato et al. | 350/174 X |
| 4,735,495 | 4/1988 | Henkes | 362/310 X |
| 4,757,431 | 7/1988 | Cross et al. | 362/296 X |
| 4,765,718 | 8/1988 | Henkes | 350/345 |

Primary Examiner—Ira S. Lazarus
Assistant Examiner—Peggy A. Neils

[57] ABSTRACT

Display system includes an illumination system which utilizes a light collector in the form of a non-imaging reflector having a rectangular output aperture, a modulating device in the path of light emitted by the illumination system, and a projection lens. Three such collectors having spectrally tuned lamps therein and using rectangular LCD's as modulating devices can be used in a television projection system.

22 Claims, 4 Drawing Sheets

LIGHT VALVE PROJECTION SYSTEM WITH NON IMAGING OPTICS FOR ILLUMINATION

BACKGROUND OF THE INVENTION

The present invention relates to high efficiency collection optics and more particularly to a projection system with a combination of a light source and a reflector having a low maximum deviation angle, with respect to collimated light rays, to ensure collection by the rest of the optics in the system.

The possibility of using liquid crystal displays in projection television is well accepted, and several system have been proposed. In an article on pages 375-377 of the 1986 issue of *Society of Information Display Digest*, Seiko Epson Corporation discloses a projection system including an illumination subsystem, a modulating device in the path of light emitted from the illumination subsystem, and a projection lens for projecting the image of the modulating device. More specifically, an illumination subsystem in the form of a halogen lamp and a spherical reflector projects light through the condenser lens to a pair of dichroic mirrors which split the light into its red, blue, and green components. Each beam component impinges a respective modulating device in the form of a liquid crystal display (LCD); a dichroic prism combines the three monochromatic images into a single color image which the projection lens projects onto a screen. The article states that the system offers the advantages of compactness, low cost, and brightness. Despite the latter claim, though, the overall light collection efficiency of the system is still less than 1%. That is, for a tungsten halide lamp producing 8800 lumens, less than 60 lumens reach the projection screen. This low efficiency is largely due to the fact that only a small percentage of the light rays is collected and directed toward the modulating device and the entrance pupil of the projection lens.

A further discussion of conventional illumination systems will be helpful. It is well known that a parabolic reflector with a point light source at the focal point of the parabola can provide collimated light beams, and thus offers a potentially high collection efficiency. However, lamps have finite source sizes which result in large deviation angles at the output aperture of a parabolic reflector. Even if a very small lamp is used, light displacements from the focal point can result in additional deviation. Further, when the light valve and thus the reflector are small, it may be impossible to center the lamp at the focal point due to the finite envelope size. The most efficient refractive lens condensing systems are not as efficient (typically less than 43% efficiency) and require expensive multi-element lenses to limit deviation angles. In these refractive lens condensing systems, the envelope size of the lamp is not as important.

Further, when either a parabolic reflector or a refractive lens condensing system used with a rectangular light valve such as an LCD for TV pictures, "fill factor" further diminishes efficiency. For example, for an LCD having a 4 to 3 aspect ratio, only 61% of a circumscribing circle representing the light beam is filled by the LCD. For a 5.33 to 3 aspect ratio as proposed for high definition television, the fill factor is only 54%.

From the foregoing it is apparent that it would be desirable to have a more highly efficient illumination system, that is, a system with far greater lumen output at the output of the reflector as a percentage of lumen output of the lamp. In order to improve the eficiency of the system as a whole, which is the luminous flux at the projection screen as a percentage of lumen output of the lamp, it will also be necessary to keep the maximum deviation angle of light emitted by the illumination system to a minimum. For a large aperture F/2.0 projection lens, this maximum deviation angle would be 15°. Finally, since rectangular light valves in the form of LCDs will be used and it would be desirable to have a 100% fill factor, the illumination system should have a rectangular output aperture corresponding to the shape of the LCD.

SUMMARY OF THE INVENTION

According to the invention, the illumination subsystem includes a first non-imaging reflector having a rectangular output aperture and a central Z axis. The light source is positioned inside the reflector along the central axis for illuminating the modulating device at least substantially uniformly.

The use of non-imaging optics to efficiently collect sunlight in solar energy applications is well known. See, for example, "The Optics of Non Imaging Concentrators", Welford and Winston, Academic Press, 1978. A typical non-imaging concentrator is a trough-shaped reflector with an input aperture and a pair of opposed sidewalls which converge toward a closed end. The sidewalls are configured to concentrate incident energy onto an energy receiver such as a photo-voltaic cell or a fluid carrying pipe positioned inside the reflector. Such a concentrator is discussed in U.S. Pat. No. 4,002,499, which teaches a concentrator configured for optimal concentration of radiant energy on a cylindrical absorber such as a pipe. The sidewalls ae symmetric and meet at a cusp which contacts the pipe. U.S. Pat. No. 4,230,095, which is hereby incorporated by reference, discloses the ideal profile for a trough-shaped concentrator with a gap between the absorber and the reflector. This is the situation for a pipe concentrically located within a transparent glazing, and utilizes symmetric sidewalls which meet at a cusp which contacts the glazing.

The solar concentrators offer the advantage that all light within a predetermined angle of acceptance is focussed onto the energy absorber. The wider the angle of acceptance, the larger the absorber must be. Likewise, the angle of acceptance is more narrowly confined for a smaller absorber, resulting in greater light concentration. Concentrators with small acceptance angles require solar tracking to achieve absorption over more hours in a day.

The invention recognizes that non-imaging reflectors, heretofore used primarily in solar energy concentrators, are ideal for a light projection system having a collector with an output aperture which corresponds to the input aperture of a concentrator and vice versa. The deviation angle of the light at the output aperture of the collector in the form of a non-imaging reflector thus has a well defined limit, just as the input in a concentrator has a well defined field of acceptance. The collector may thus be designed in conjunction with a given lamp to minimize deviation angle, making it possible to maximize efficiency when used in a projection system. When the modulating device is a predetermined size, and if the modulating device is immediately adjacent the output aperture of the collector, the dimensions of the modulating device and the maximum deviation angle will determine the shape of the collector.

According to a preferred embodiment the light source is substantially cylindrical and is centered in the XY plane. The source includes an arc with a length along the Y-axis and a radius along the X-axis, and further includes a cylindrical envelope concentric to the arc. The cross-section of the reflector in the XY plane is at least substantially rectangular, and the cross-section in YZ plane comprises a compound parabola. The cross-section in the XZ plane is trough-shaped, with two symmetric sidewalls which meet at a cusp in contact with the envelope, and has an ideal contour determined with respect to a virtual arc shape defined by the actual arc and two lines tangent thereto which intersect at the cusp.

According to a further preferred embodiment, the modulating device is rectangular and is immediately adjacent the output aperture.

The display system is especially useful in a projection color television system having three illumination subsystems according to the preferred embodiment, where the respective lamps are spectrally tuned to the red, green, and blue wavelengths and the modulating devices are liquid crystal displays (LCDs). Such a system must further comprise means for combining the images of the LCDs for projection by the lens. Such means could comprise a dichroic prism or a pair of dichroic filters.

The display system could also find use in a television projection system with only a single illumination subsystem according to the preferred embodiment, and a pair of dichroic filters for separating the light into three channels. Three LCDs would be located in the paths of light in respective channels, and combining means such as additional filters or a prism would be used to combine the images for projection.

In its broadest aspect the present invention relates to an illumination system used as the illumination subsystem in the display system so far described. That is, an illumination system having a light source used with a non-imaging reflector having a rectangular output aperture and a central Z axis. The non-imaging reflector cooperates with the light source to illuminate the output aperture, and thus the modulating device, at least substantially uniformly. According to a preferred embodiment the light source is cylindrical, and the reflector is as described for a cylindrical light source in a display system according to the invention.

Other shapes of light sources and other forms of non-imaging reflectors than those described may be used to achieve substantially uniform illumination of the modulating device. Each form of non-imaging reflector has its own characteristics. For example, the compound parabolic shape is especially suitable when uniform illumination of the output aperture is desired. This is the case when the modulating device is at the output aperture. However, some non-imaging reflectors can provide substantially homogeneous illumination in more remote planes. A compound elliptical reflector, for example, can illuminate a plane remote from the output aperture substantially homogeneously. Thus, it may be suitable where the modulating device is remote from the output aperture.

BRIEF DESCRIPTION OF THE DRAWINGS

FIG. 1b is a cross-section in the YZ plane of FIG. 1a;
FIG. 1c is a cross-section in the XZ plane of FIG. 1a.

DETAILED DESCRIPTION OF THE PREFERRED EMBODIMENTS

Figure 1A:
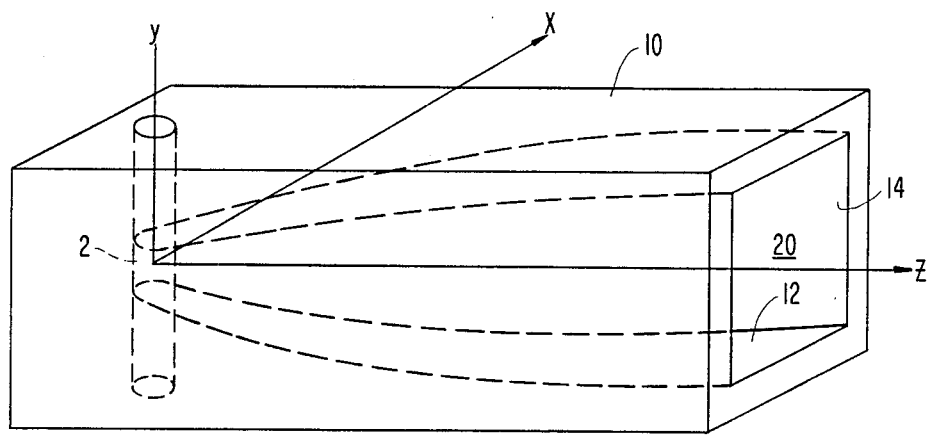
FIG. 1a is a perspective of a non-imaging collector with a cylindrical light source.

FIG. 1a depicts a cylindrical light source 2 in a collector in the form of a non-imaging reflector 10 having a rectangular output aperture 20. For convenience in describing the reflector it is superposed on a rectangular coordinate system with the Z-axis extending centrally through the reflector and the light source centered in the XY plane.

Figure 1B:
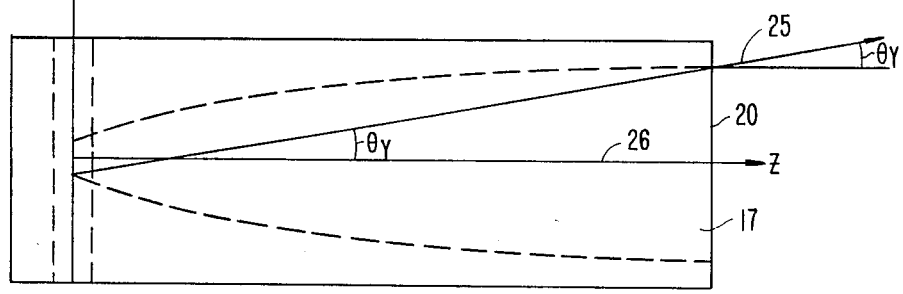
Figure 1C:
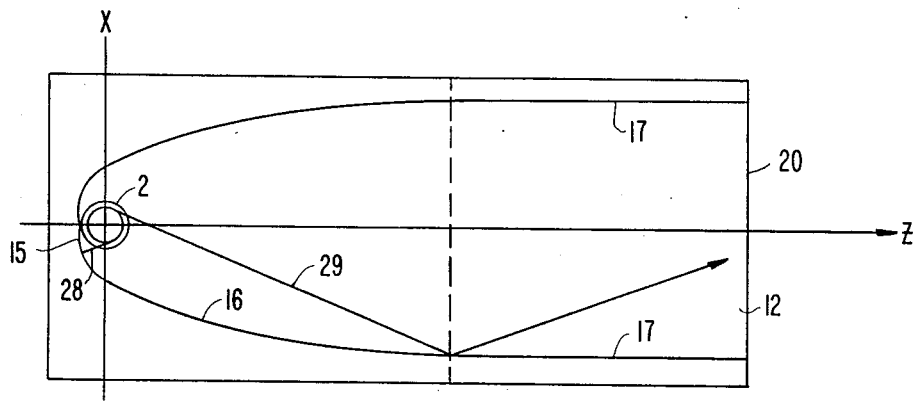
Figure 2:
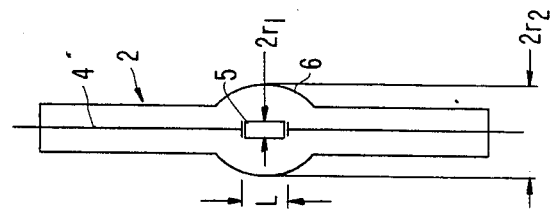
FIG. 2 is an elevation view of a cylindrical light source.

Referring to FIG. 2, the light source 2 is an arc lamp such as a xenon arc lamp or a metal halide arc lamp having a pair of electrodes 4 for forming an arc 5 of length L and radius $r_1$ therebetween. The arc 5 is concentrically located in a cylindrical glass envelope 6 having a radius $r_2$ in the vicinity of the arc 5. Referring to FIGS. 1a, 1b, and 1c, the length of the arc extends along the Y-axis and a radius extends along the X-axis.

FIG. 1b shows the profile of the top and bottom sidewalls 12 of the reflector, which profile is preferably a compound parabola to minimize the deviation angle $\theta_y$, where $\theta_y$ is the maximum angle between the Z-axis and light rays exiting from output aperture 20. As described in companion U.S. application Ser. No. 137,049, entitled "Light Valve Projection System with Improved Illumination", which is filed concurrently with this application and is hereby incorporated by reference, a compound parabola is achieved by rotating a parabolic shape 180° with its axis along line 25 about the reflector axis 26 (herein the Z-axis). This is the ideal reflector profile in the YZ plane and planes parallel thereto when the arc 5 extends from one sidewall 12 to the other. The ideal reflector profile parallel to the axis of a cylindrical light source is thus the same as the profile for a planar source as described in the companion case, wherein a light source outside the reflector is considered as a planar source at the input aperture of the collector.

It can be shown that:

$$y = \frac{L}{2} - \frac{Z\cos\theta_y \sin\theta_y + L(1 + \sin\theta_y)}{\cos^2\theta_y} + \frac{\sqrt{L(1 + \sin\theta_y)[2Z\cos\theta_y + L(1 + \sin\theta_y)]}}{\cos^2\theta_y}$$

Referring to FIG. 1c, the cross-section of the collector in the XZ plane and planes parallel thereto is bounded by vertical sidewalls 17. The sidewalls 17 are symmetric and meet at a cusp in contact with the lamp envelope 6. From a mathematical standpoint, each sidewall 17 has three segments which define the ideal contour with respect to a virtual arc shape defined by lines tangent to the arc which intersect at the cusp. The first segment 15 of each sidewall is the involute of the virtual arc extending from the cusp to the line formed by a ray along line 28 as shown. The second or intermediate segment 16 follows the rule that rays emitted tangent to the virtual arc will have a maximum angle of $\theta_x$ with the Z-axis. This segment extends to the intersection of line 29 and the reflector. The segments 15 and 16 correspond to the shape of a reflector for a glazed cylindrical absorber as described in U.S. Pat. No. 4,230,095, incorporated herein by reference. The third segment 17 is rectilinear in cross-section (planar in the reflector) and parallels the opposed segment 17 of the other sidewall 14. The segments 17 merely reflect light without increasing $\theta_x$, and are necessary to extend the ideal reflector profile in the XZ plane to the output aperture. Where a longer reflector is desired without increasing the size of output aperture 20 the sidewalls 12 may likewise be extended in parallel, essentially forming a light pipe.

Figure 3:
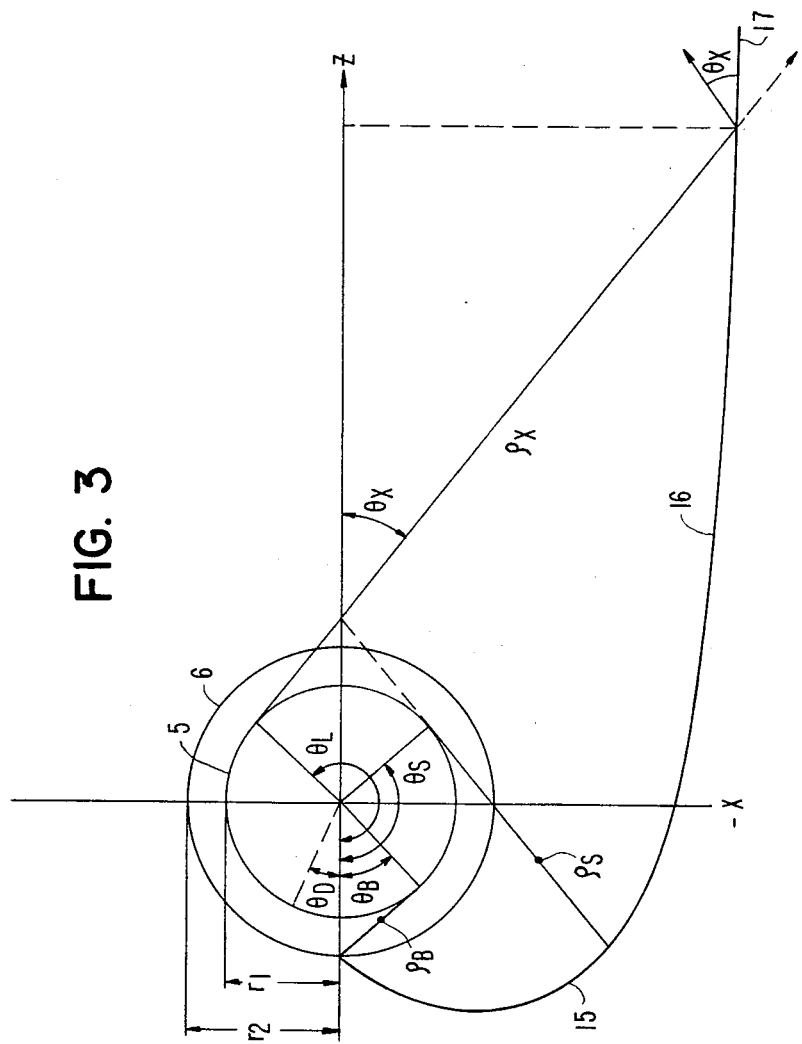
FIG. 3 illustrates the mathematics of the collector profile of FIG. 1c.

FIG. 3 shows the section through the XZ plane in greater detail, with the reflector profile defined in terms of $\rho$ and $\theta$, where $\rho$ is the length of a line tangent to the light source measured from the source to the collector, and $\theta$ is the angle between the normal to the tangent line and the -Z-axis. Note that:

$$\theta_B = \cos^{-1}\left(\frac{r_1}{r_2}\right)$$

$$\theta_s = \theta_x + \frac{\pi}{2}$$

$$\theta_L = \frac{3\pi}{2} - \theta_x$$

Angles $\theta_B$ and $\theta_s$, measured with respect to the -Z-axis, defined the start and end of segment 15 and $\theta_L$ defines to the end of the segment 16. Similarly, $\rho_B$ and $\rho_s$ are the length of the tangent lines which define the beginning and end of involute segment 15. $\rho_x$ is the length of the line which defines the end of segment 16. Here the light ray represented by $\rho_x$ would exit the reflector were it not for the planar sections 17 (FIG. 1c). Thus the first or involute section 15 may be defined by $$\rho = (\theta + \theta_D)r_1 \text{ for } \theta_B < \theta < \theta_s$$

where $\theta_D$ is the overlap angle, i.e., the increment over $\theta_B$ which when added thereto would subtend an arc of length $\rho_B$. $\theta_D$ is given by $$\theta_D = \sqrt{\left(\frac{r_2}{r_1}\right)^2 - 1} - \theta_B$$

The second or intermediate segment 16 is defined by $$\rho = \frac{r_1\left[\theta + 2\theta_D + \theta_x + \frac{\pi}{2} - \cos(\theta - \theta_x)\right]}{1 + \sin(\theta - \theta_x)} \text{ for } \theta_s < \theta < \theta_L$$

In x,z coordinates this becomes $X = r_1 \sin\theta - \rho \cos\theta$ $Z = r_1 \cos\theta + \rho \sin\theta$ Based on the foregoing, it can be shown that for an output aperture 50 mm by 67 mm and a source with an arc length L of 6 mm, an arc radius of $r_1$ of 0.5 mm and an envelope radius of 5 mm, $\theta_x = 9.9°$ and $\theta_y = 6.9°$.

Note that the above mathematics are found in the prior art, e.g. Winston and Welford, supra, and are given here solely for convenience. Note also that other non-imaging reflectors such as compound elliptical and compound hyperbolic concentrators can be used to achieve substantially uniform illumination of an output aperture where limiting the deviation angle of light emitted. Further, some reflectors such as the compound elliptical reflector are known to provide substantially uniform illumination of a plane remote from the output aperture. See, inter alia, Welford and Winston, Supra; Eichhorn, "Designing generalized conic concentrators for conventional optical systems". Applied Optics, Vol. 24, No. 8; U.S. Pat. No. 3,957,031. Note also that other shaped sources could likewise be used to illuminate a rectangular output aperture. With a point or spherical source, for example, a cusp would be formed in both the XZ and the YZ planes.

Thus it is not the geometry of non-imaging reflectors but the recognition of their usefulness in conjunction with internal light sources and projection systems which constitutes the invention. The beam of light emitted by an illumination system comprising a source with a non-imaging reflector yields sufficiently low deviation angles with respect to collimated light that a projection television system utilizing LCDs is feasible to manufacture. Several examples of such projection systems follow.

Figure 4:
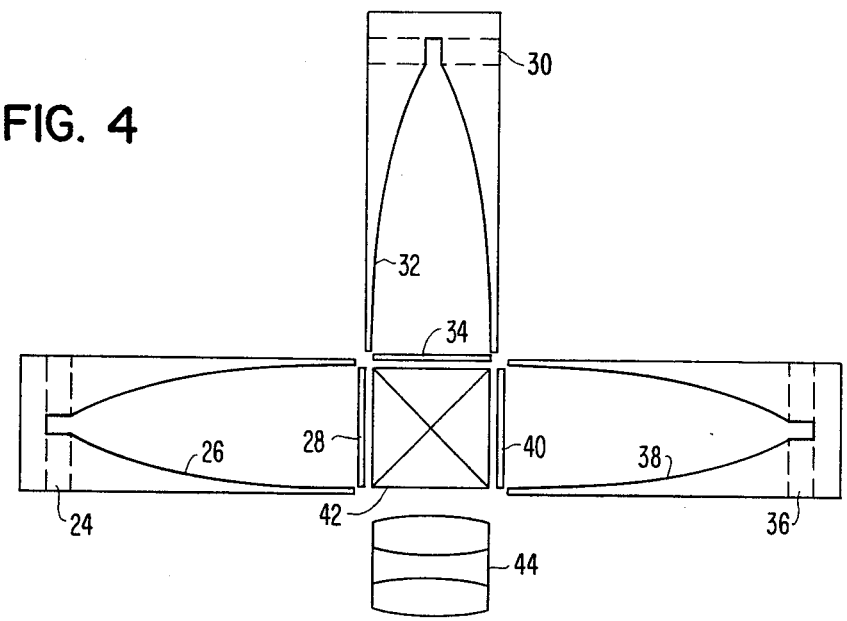
FIG. 4 is a plan view of a three lamp system with a dichroic prism.
Figure 5:
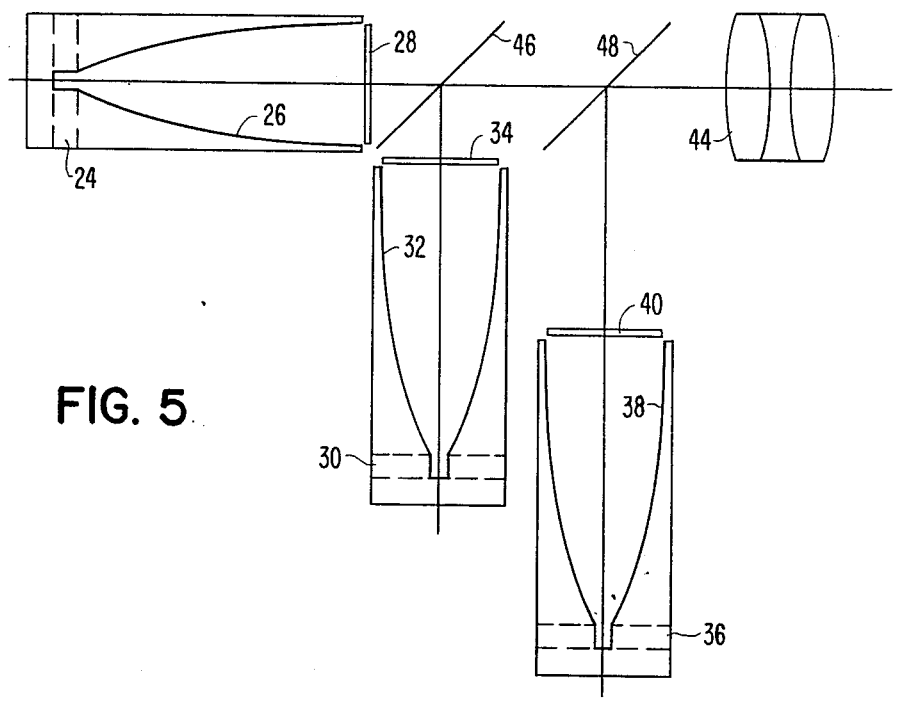
FIG. 5 is a plan view of a three lamp system with two dichroic filters.

FIG. 4 shows three lamps 24, 30, and 36 which are spectrally tuned to the red, green, and blue portions of the visible spectrum. These are used in conjunction with respective non-imaging reflectors 26, 32, 38 to illuminate the LCDs 28, 34, 40. The red, green, and blue images on the LCDs are then combined by dichroic prism 42 for projection by lens 44. FIG. 5 is another three lamp system wherein the images of LCDs 28 and 34 are combined by dichroic filter 46 then further combined with the image of LCD 40 by dichroic filter 48 for projection by lens 44.

Figure 6:
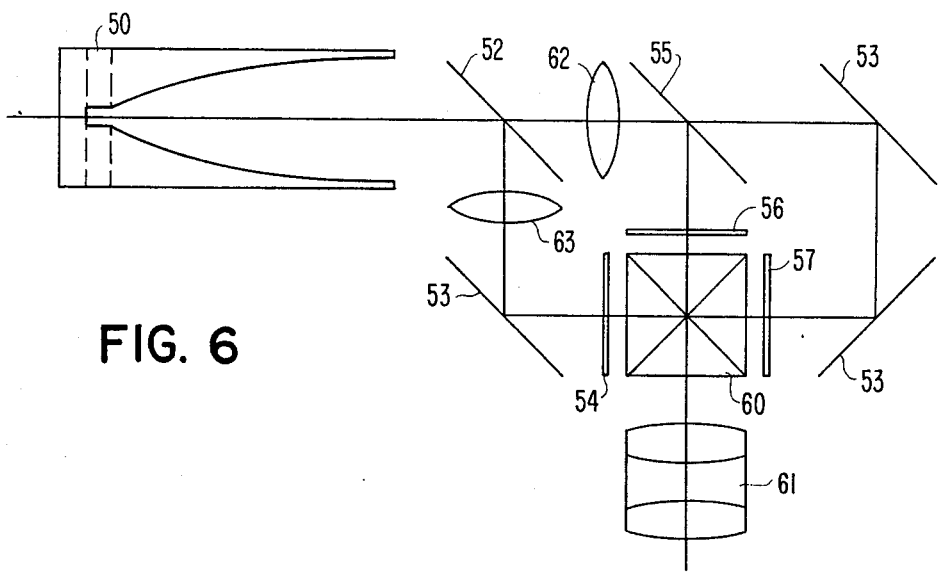
FIG. 6 is a plan view of a single lamp system with dichroic filters for color separation and a dichroic prism combining the images.
Figure 7:
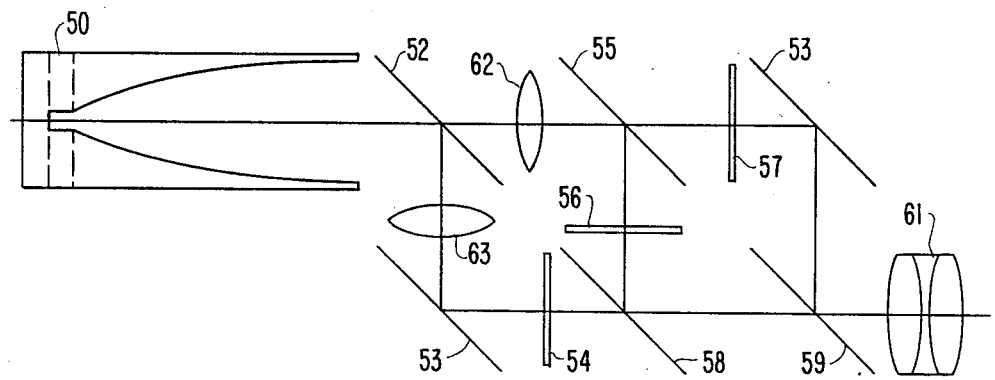
FIG. 7 is a plan view of a single lamp system with dichroic filters for color separation and dichroic filters for combining the images.

FIG. 6 shows a source of white light 50 which is divided into red, green, and blue channels by dichroic filters 52, 55 and reflected via mirrors 53 toward respective LCDs 54, 56, 57 then combined by prism 60 for projection by lens 61. Lenses 62 and 63 are used to image the output aperture of the non-imaging reflector to the LCDs. FIG. 7 again shows a white light source 50 and dichroic filters 52, 55 to image the three chaannels onto respective LCDs but dichroic filters 58, 59 are used to combine the images for projection by lens 61.

The foregoing is exemplary and not intended to limit the scope of the claims which follow.

I claim:

1. A display system of the type comprising an illumination subsystem including a light source, said subsystem being disposed within a spatial coordinate system having orthogonal X, Y, and Z axes, and comprising a first non-imaging reflector having a rectangular output aperture disposed centrally about said Z axis, said light source being positioned inside said reflector along said Z axis for illuminating said output aperture, said non-imaging reflector having sidewalls extending from said light source in the direction of said Z-axis, said sidewalls having a profile which is a regularly curved contour along at least a portion of the distance between said light source and said output aperture to provide light rays having a low angle of deviation exiting from said output aperture, a first substantially rectangular modulating device in the path of light emitted by said illumination subsystem, said reflector cooperating with said light source to illuminate said modulating device substantially uniformly in a rectangular pattern; and a projection lens for projecting the substantially rectangular image of said modulating device to form at least a portion of a display.

2. A display system as in claim 1 wherein said light source is substantially cylindrical and is centered in the XY plane, said light source having an arc with a length along the Y-axis and a radius along the X-axis, said source further comprising a cylindrical envelope concentric to said arc.

3. A display system as in claim 2, wherein the cross-section of said reflector in the XY plane is at least substantially rectangular.

4. A display system as in claim 3 wherein a cross-section of said reflector in the YZ plane comprises a compound parabola.

5. A display system as in claim 3 wherein a cross-section of said reflector in the XZ plane is trough shaped and comprises two symmetric sidewalls which meet at a cusp in contact with the envelope, said cross-section in the XZ plane having an ideal contour determined with respect to a virtual arc shape defined by the actual arc and two tangents thereto which intersect at the cusp.

6. A display system as in claim 5 wherein said sidewalls comprise parallel bounding surfaces adjacent said output aperture.

7. A display system as in claim 1 wherein said modulating device is a liquid crystal display.

8. A display system as in claim 1 wherein said first modulating device is a liquid crystal display immediately adjacent said output aperture.

9. A display system as in claim 1 further comprising
second and third non-imaging reflectors having respective output apertures,
second and third light sources in respective second and third concentrators,
second and third modulating devices in the path of light emitted from the respective output apertures,
means for combining the images of said modulating devices for projection by said projection lens.

10. A display system as in claim 9 wherein said modulating devices are immediately adjacent respective output apertures.

11. A display system as in claim 9 wherein the output apertures of the first, second, and third reflectors are rectangular, said modulating devices likewise being rectangular and of substantially the same shape as respective output apertures.

12. A display system as in claim 9 wherein said light sources are lamps which are respectively spectrally tuned to the red, blue and green portions of the visible spectrum.

13. A display system as in claim 9 wherein said means for combining said images comprises a dichroic prism system.

14. A display system as in claim 9 wherein said means for combining said images comprises a pair of dichroic filters, one of said filters combining the images of respective first and second modulating devices, the other said filter combining the combined images of the first and second modulating devices with the image of the third modulating device for projection by said lens.

15. A display system as in claim 1 wherein said first light source is a white light source, said system further comprising
a pair of dichroic filters which separate the light from said source into three channels,
second and third modulating devices, each of said modulating devices receiving one of said channels, and
means for combining the images of said modulating devices for projection by said projection lens.

16. A display system as in claim 15 wherein said means for combining said images comprises a dichroic prism.

17. A display system as in claim 15 wherein said means for combining said images comprises a second pair of dichroic filters.

18. An illumination system disposed within a spatial coordinate system having orthogonal X, Y and Z axes and being of the type comprising a light source and a collector having an output aperture, characterized in that said collector is a non-imaging reflector having a rectangular output aperture disposed along a central Z-axis, said light source being substantially cylindrical and centered in the XY plane, said light source having an arc with a length along the Y-axis and a radius along the X-axis, said source further comprising a cylindrical envelope concentric to said arc and being positioned inside said reflector along said central axis for illuminating said output aperture, said non-imaging reflector having sidewalls extending from said light source in the direction of said Z-axis, said sidewalls having a profile which is a regularly curved contour along at least a portion of the distance between said light source and said output aperture to provide light rays having a low angle of deviation exiting from said output aperture, said non-imaging reflector cooperating with said light source to illuminate said output aperture substantially uniformly in a substantially rectangular pattern.

19. An illumination system as in claim 18 wherein the cross-section of said reflector is the XY plane is at least substantially rectangular.

20. An illumination system as in claim 18 wherein a cross-section of said reflector in the yz plane comprises a compound parabola.

21. An illumination system as in claim 19 wherein a cross-section of said reflector in the XZ plane is trough-shaped and comprises two symmetric sidewalls which meet at a cusp in contact with the envelope, said cross-section in the XZ plane having an ideal contour determined with respect to a virtual arc shape defined by the actual arc and two tangents thereto which intersect at the cusp.

22. An illumination system as in claim 21 wherein said sidewalls comprise parallel bounding surfaces adjacent said output aperture.

* * * * *